US012652422B2

(12) United States Patent (10) Patent No.: US 12,652,422 B2
Dincer (45) Date of Patent: Jun. 9, 2026

(54) CONTENT MARKING SYSTEM

(71) Applicant: ERSTREAM YAYINCILIK ANONIM SIRKETI, Istanbul (TR)

(72) Inventor: Ramazan Dincer, Istanbul (TR)

(73) Assignee: ERSTREAM YAYINCILIK ANONIM SIRKETI, Istanbul (TR)

( * ) Notice: Subject to any disclaimer, the term of this patent is extended or adjusted under 35 U.S.C. 154(b) by 0 days.

(21) Appl. No.: 18/684,185

(22) PCT Filed: Aug. 25, 2022

(86) PCT No.: PCT/TR2022/050911
§ 371 (c)(1),
(2) Date: Feb. 16, 2024

(87) PCT Pub. No.: WO2023/101637
PCT Pub. Date: Jun. 8, 2023

(65) Prior Publication Data
US 2025/0142141 A1     May 1, 2025

(30) Foreign Application Priority Data
Dec. 2, 2021   (TR) ............................... 2021/019005

(51) Int. Cl.
| | |
|---|---|
| *H04N 21/2347* | (2011.01) |
| *H04N 21/234* | (2011.01) |
| *H04N 21/239* | (2011.01) |
| *H04N 21/258* | (2011.01) |
| *H04N 21/266* | (2011.01) |
| *H04N 21/418* | (2011.01) |
| *H04N 21/426* | (2011.01) |
| *H04N 21/431* | (2011.01) |
| *H04N 21/442* | (2011.01) |
| *H04N 21/4627* | (2011.01) |

(52) U.S. Cl.
CPC . *H04N 21/23424* (2013.01); *H04N 21/25816* (2013.01); *H04N 21/44213* (2013.01)

(58) Field of Classification Search
None
See application file for complete search history.

(56) References Cited

U.S. PATENT DOCUMENTS

| | | | |
|---|---|---|---|
| 2002/0172394 A1 | 11/2002 | Venkatesan et al. | |
| 2007/0092103 A1 | 4/2007 | Mihcak et al. | |
| 2013/0120651 A1* | 5/2013 | Perry ................. | H04N 21/8358 |
| | | | 348/441 |
| 2014/0325550 A1* | 10/2014 | Winograd .......... | H04N 21/8456 |
| | | | 725/19 |
| 2017/0155933 A1 | 6/2017 | Del Strother et al. | |
| 2018/0014089 A1* | 1/2018 | Hazan ................ | H04N 21/8352 |
| 2018/0014414 A1* | 1/2018 | Kim ....................... | H10K 50/84 |
| 2019/0141414 A1* | 5/2019 | Goodes ............ | H04N 21/25833 |
| 2019/0207949 A1* | 7/2019 | Parker ................ | G06Q 20/3274 |
| 2020/0226233 A1* | 7/2020 | Penugonda .......... | H04L 9/3239 |

FOREIGN PATENT DOCUMENTS

WO       2020053870 A1     3/2020

* cited by examiner

*Primary Examiner* — Brian T Pendleton
*Assistant Examiner* — Jean D Saint Cyr
(74) *Attorney, Agent, or Firm* — Bayramoglu Law Offices

(57) ABSTRACT
A pirate broadcasting detection system detects the credentials of a subscriber if it is detected that a video part is used by at least one pirate user other than the subscriber while a video part created by a source is received from the source and transmitted to a client of a subscriber.

6 Claims, 2 Drawing Sheets

CONTENT MARKING SYSTEM

CROSS REFERENCE TO RELATED APPLICATIONS

This application is a national stage entry of International Application No. PCT/TR2022/050911, filed on Aug. 25, 2022, which is based upon and claims foreign priority to Turkey Patent Application No. 2021/019005, filed on Dec. 2, 2021, the entire contents of which are incorporated herein by reference.

TECHNICAL FIELD

The invention relates to a content marking system for marking the video contents displayed by subscribers each with different identification numbers to include the identification number provided for each subscriber.

BACKGROUND

Today, video and television broadcasting on the internet is rapidly developing at home and abroad. According to a recent study, approximately 75% of the data transmitted over the internet today is video. This rate is expected to increase further in the coming years. With the widespread use of video and television broadcasting over the internet, the broadcasts are offered to the user for a certain fee. This situation causes a tendency towards pirate broadcasting, especially in Türkiye. However, pirate broadcasting can cause both moral and material losses on behalf of both institutions and the state. In addition, based on the obligation to protect copyrights pirate broadcasting is considered illegal because it prevents the protection of video content and the protection of video content is ensured by law. Today, there are various studies to detect and prevent the increasing pirate broadcasting content, especially in Türkiye.

One of the said studies describes a system that enables the offline addition of a user's credentials to the broadcast content in application No. WO2020053870. If a client requests a video in the said system, the data containing the information of this person is placed randomly in the video content upon request. However, the said process is not performed instantly. The process is prepared offline in the background and the user is kept waiting within this period. The fact that the procedure is performed in the background may increase time and data loss. Although the said solution prevents pirate broadcasting for offline broadcasts, it cannot protect live and instantly presented video content. This situation shows that the methods used are inadequate and cause the said problem to increase exponentially.

All the problems mentioned above have made it necessary to make an innovation in the related technical field as a result.

SUMMARY

The present invention relates to a content marking system to eliminate the above-mentioned disadvantages and to bring new advantages to the related technical field.

An object of the invention is to provide a pirate broadcasting detection system that enables the detection of pirate users who hack and rebroadcast internet broadcasts.

The present invention comprises a server for enabling the video part to be received from the said source and transmitted to the said client live, to realize all the objects that are mentioned above and will emerge from the following detailed description;

the said server is configured to perform the following steps;

dividing the video part received from the source into a plurality of image frames, adding at least one mark that contains unique credentials of the subscriber to at least one of the image frames, combining the video part divided into the image frames containing the marked image frame, to be sent to the client.

A possible embodiment of the invention is characterized in that the server has received data containing pirate broadcasting information before dividing the video part into a plurality of image frames.

Another possible embodiment of the invention is characterized in that the server is configured to detect the credentials of the subscriber containing the marked image frame if at least one of the marked image frames is detected on the pirate broadcasting detected according to the received pirate broadcasting information.

Another possible embodiment of the invention is characterized in that the server is configured to randomly select and mark at least one of the image frames in a video part.

Another possible embodiment of the invention is characterized in that the server is configured to place the mark containing the credentials of the subscriber in a random position on the image frame.

BRIEF DESCRIPTION OF THE DRAWINGS

A representative view of the content marking system is given in FIG. 1.

A representative view of the operating scenario of the content provision system is given in FIG. 2.

REFERENCE NUMBERS GIVEN IN THE FIGURES

Figure 1:
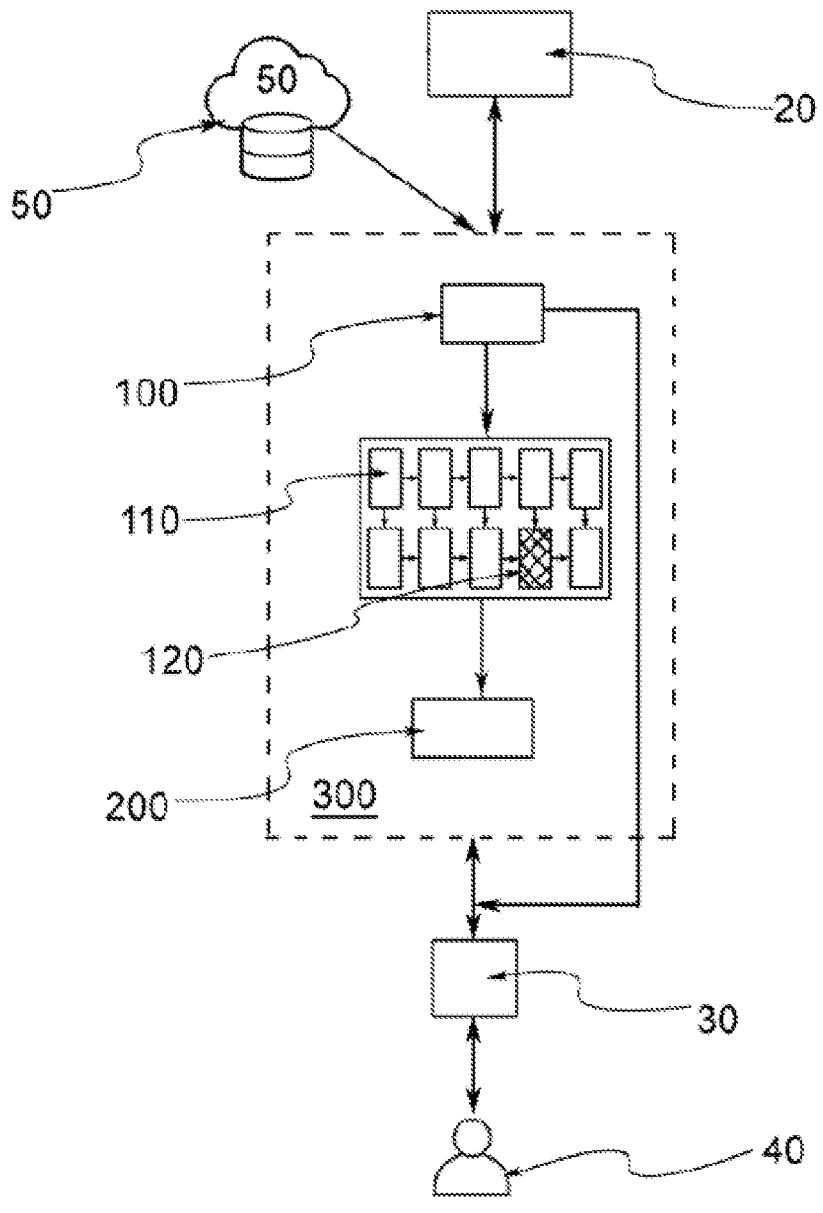

10 Pirate broadcasting detection system
100 Video part
110 Image frame
120 Marked image frame
200 Marked video part
300 Server
20 Source
30 Client
40 Subscriber

DETAILED DESCRIPTION OF THE EMBODIMENTS

The subject of the invention is explained with examples that do not have any limiting effect only for a better understanding of the subject in this detailed description.

The invention relates to a pirate broadcasting detection system (10) for detecting the credentials of the said subscriber (40) if it is detected that the said video part (100) is used by at least one pirate user other than the said subscriber (40) while a video part (100) created by a source (20) is received from the said source (20) and transmitted to a client (30) of a subscriber (40).

Figure 2:
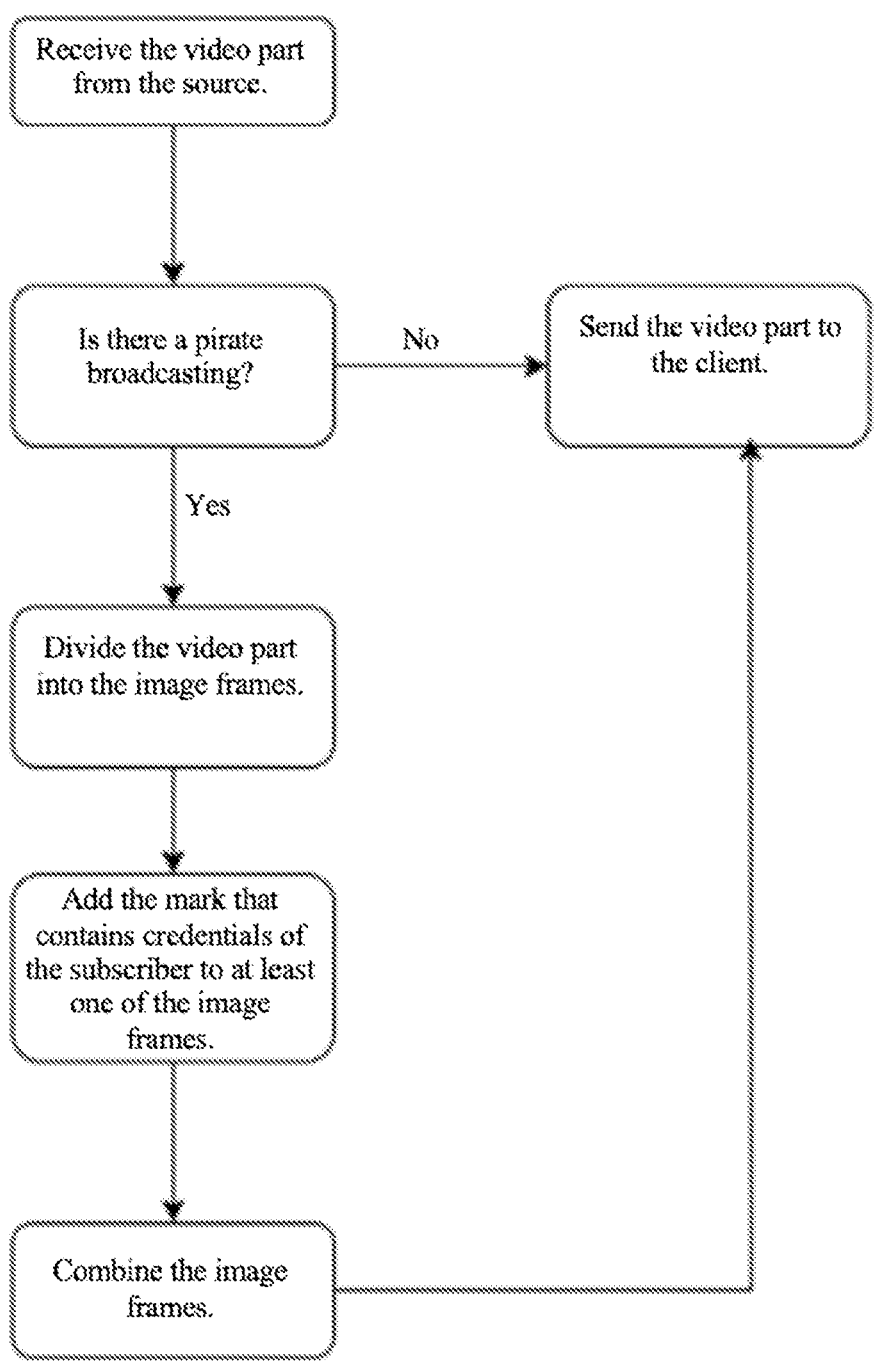

The source (20) is a channel, etc. production unit that enables video content to be created live to be viewed by the subscribers (40), referring to FIGS. 1 and 2. The source (20)

enables the video content to be created in the form of parts for predetermined periods. The video content created by the source (20) is provided in the form of a 2-second video part (100) in a possible embodiment of the invention. In another possible embodiment of the invention, the video content created by the source (20) is provided in the form of a 10-second video part (100). In another possible embodiment of the invention, the video content created by the source (20) is provided to be a video part (100) between 2 and 10 seconds. Video parts (100) created for a certain period by the source (20) are instantly transmitted to a client (30) for the subscriber (40) to display. The said client (30) comprises at least one transceiver to receive the video part (100) instantly and at least one player to display the video content. Electronic devices and/or systems such as television, a website, a tablet, a computer, an application, etc. can be used as a client (30) in a possible embodiment of the invention. The video part (100) is transmitted from the source (20) to the client (30) following a request created by the subscriber (40). There is a server (300) for transmitting the request created on the client (30) to the source and for transmitting the video parts (100) received from the source (20) to the client (30). The said server (300) is configured to enable the reading of computer-based software commands and the execution of the read software commands in a possible embodiment of the invention. There is a memory unit configured to store data associated with the server (300). The server (300) is configured to enable receiving data containing the information that a pirate broadcasting has been made from a pirate broadcasting detection unit (50). For example, websites, applications, forums, etc. where pirate broadcastings are made during a match are examined and pirate broadcasting information is transferred to the server. In this way, the server (300) enables the detection of the pirate sites according to the data received from the said pirate broadcasting detection unit (50). If the server (300) receives a signal containing the information that the pirate broadcasting is made from the pirate broadcasting detection unit (50), it enables the determination of which subscriber (40) is broadcasting. The server (300) is configured to read all of the videos prepared in different formats.

An exemplary operating scenario of the invention is described below;

The server ensures that the video parts (100) received from the source (20) are transmitted to the client (30) to be presented to the subscriber (40). If the server (300) receives a signal containing the information that a pirate broadcasting is made from the pirate broadcasting detection unit (50), it divides the video part (100) received from the source (20) into a plurality of image frames (110). The server (300) randomly selects at least one of the image frames (110) in each said video part (100). The server (300) places the mark containing the credentials of the subscriber (40) in a random position on the selected image frame (110). The said mark may be a number, barcode, QR code, written mark, both written and numerical mark, etc. in a possible embodiment of the invention. The image frame (110) in the video part (100) is specifically marked for each subscriber (40). The server (300) ensures that the marked image frames (120), and the credentials of the subscribers (40) are stored in the memory unit. By placing the mark, the video part (100) divided into the image frames (110) is combined. Thus, the marked video part (200) is formed. The server (300) ensures that the marked video part (200) is transmitted to the client (30). The video parts (100) are played in the client (30) respectively and the marked video content is presented to the subscriber (40). The pirate broadcasting information received from the pirate broadcasting detection unit (50) is tracked. If at least one of the marked image frames (120) is detected on the pirate broadcasting, it is determined to which subscriber (40) the detected mark belongs. By detecting the credentials of the subscriber (40), the server (300) can interrupt the broadcasting by the subscriber (40). In another possible embodiment of the invention, the server (300) may change the broadcast stream of the subscriber (40). The server (300) can reduce the broadcasting resolution of the subscriber (40) in another possible embodiment of the invention. The said applications can be increased without being limited to them. According to the pirate broadcasting information from the pirate broadcasting detection unit (50), the server (300) ensures that the broadcasting continues if the marked image frame (120) is not detected on the tracked broadcasting. The server (300) enables marking only if pirate broadcasting information is received from the pirate broadcasting detection unit (50). Thus, the continuous operation of the server (300) is prevented. This reduces unnecessary workload.

In an exemplary embodiment of the invention, it is ensured that a live broadcast of a football match through a channel is shot in the form of 10-second video parts (100) and transmitted to the server (300). The server (300) enables the processing of the video parts (100) received from the channel and enables them to be transmitted to the client (30) device of a subscriber (40). The said subscriber ensures that the said match is broadcast on a public site. This is detected by the pirate broadcasting detection unit (50). The server (300) connected to the pirate broadcasting detection unit (50) enables the processing of the said data. In this case, the server (300) ensures that the video parts (100) are marked before the video part (100) received from the source (20) is transmitted to the client (30). For this, the server (300) firstly ensures that the video part (100) from the channel is divided into the image frames (110). The multiple image frames (110) formed in a video part (100) are divided into groups to include at least 25 image frames (110). The server (300) enables a code containing the credentials of a subscriber (40) to be added to a corner of at least one of the said image frames (110). For example, two image frames (110) from the first 25 image frames (110) in the first three seconds of the video content are randomly selected and marked. The said marks include a number containing the credentials of the subscriber (40). Each mark is placed in a different position on each image frame (110). For example, the mark is positioned at the lowest point of the image frame in the first image frame (110), while it is positioned at the highest point in the second image frame (110). It is aimed to capture the mark escaping from a point from different points during the reading of the marks placed in different positions. The video part (100) is specifically marked for each subscriber (40). Thus, the same process is performed for all subscribers (40) connected to the server (300). The server (300) combines the image frames (110) containing the marked image frame (120) to create the marked video part (200). The marked video part (200) is transmitted to each subscriber (40) connected to the server (300) through the server (300). A video part (100) containing unique credentials is transmitted to each subscriber (40). To detect the marked image frame (120), the pirate broadcasting received from the pirate broadcasting detection unit (50) is analyzed. The server (300) ensures that the credentials contained in the mark are compared with the credentials stored in the memory unit if the marked image frame (120) is detected on the broadcasting. The server (300) ensures that the broadcasting by the subscriber (40) who is making pirate broadcasting and/or whose subscriber (40) information is stolen is interrupted as a result of the comparison. Thus, pirate broadcasting is prevented. The server (300) continues broadcasting if the marked image frame (120) is not detected on the broadcasting.

The scope of protection of the invention is specified in the attached claims and cannot be limited to those explained for sampling purposes in this detailed description. It is evident that a person skilled in the art may exhibit similar embodiments in light of the above-mentioned facts without departing from the main theme of the invention.

The invention claimed is:

1. A pirate broadcasting detection system for detecting credentials of a subscriber when a video part is used by at least one pirate user other than the subscriber while a video part created by a source is received from the source and transmitted to a client of the subscriber, comprising; a server for enabling the video part to be received from the source and transmitted to a client live; the server is configured to perform the following steps:

dividing the video part received from the source into a plurality of image frames, adding, only in response to detection that a video stream is being pirated, at least one mark that contains unique credentials of the subscriber to at least one of the image frames, and combining the video part divided into the image frames containing the marked image frame, to be sent to the client as part of said video stream.

2. The pirate broadcasting detection system according to claim 1, wherein the serve receives data containing pirate broadcasting information before dividing the video part into a plurality of image frames.

3. The pirate broadcasting detection system according to claim 1, wherein the server is configured to detect the credentials of the subscriber containing the marked image frame if at least one of the marked image frames is detected on the pirate broadcasting detected according to received pirate broadcasting information.

4. The pirate broadcasting detection system according to claim 1, wherein the server is configured to randomly select and mark at least one of the image frames in a video part.

5. The pirate broadcasting detection system according to claim 1, wherein the server is configured to place the mark containing the credentials of the subscriber in a random position on the image frame.

6. The pirate broadcasting detection system according to claim 1, wherein the server is configured to realize the steps of:

randomly selecting at least one of the image frames in each video part; and placing the mark, containing the credentials of the subscriber, in a random position on the selected image frame.

* * * * *